US010293939B2

(12) United States Patent
Conejero Moreno et al.

(10) Patent No.: US 10,293,939 B2
(45) Date of Patent: May 21, 2019

(54) ANTI-RATTLING DEVICE FOR PALLETS IN CARGO AIRCRAFT

(71) Applicant: AIRBUS DEFENCE AND SPACE, S.A.U., Getafe (ES)

(72) Inventors: Federico Conejero Moreno, Getafe (ES); Unai García Feijoo, Getafe (ES)

(73) Assignee: AIRBUS DEFENCE AND SPACE, S.A.U., Getafe (ES)

( * ) Notice: Subject to any disclaimer, the term of this patent is extended or adjusted under 35 U.S.C. 154(b) by 0 days.

(21) Appl. No.: 15/817,367

(22) Filed: Nov. 20, 2017

(65) Prior Publication Data

US 2018/0141662 A1 May 24, 2018

(30) Foreign Application Priority Data

Nov. 24, 2016 (EP) .................................... 16382553

(51) Int. Cl.
*B64D 9/00* (2006.01)
*B60P 7/13* (2006.01)

(52) U.S. Cl.
CPC ................ *B64D 9/003* (2013.01); *B60P 7/13* (2013.01)

(58) Field of Classification Search
CPC .......... B64D 9/003; B60P 7/08; B60P 7/0807; B60P 7/0892; B60P 7/10; B60P 7/13
See application file for complete search history.

(56) References Cited

U.S. PATENT DOCUMENTS

| | | | | | |
|---|---|---|---|---|---|
| 2,424,429 | A * | 7/1947 | Bamberg | B60P 7/13 | 410/116 |
| 3,604,363 | A * | 9/1971 | Smith | B60P 7/13 | 410/70 |
| 3,604,364 | A * | 9/1971 | Sweger | B60P 7/13 | 410/70 |
| 3,643,603 | A * | 2/1972 | King | B60P 7/13 | 213/75 R |
| 3,774,551 | A * | 11/1973 | Sweger | B60P 7/13 | 410/70 |
| 3,800,713 | A | 4/1974 | Nordstrom | | |
| 4,349,168 | A | 9/1982 | Barnes et al. | | |
| 4,372,715 | A | 2/1983 | Naffa | | |

(Continued)

FOREIGN PATENT DOCUMENTS

| | | |
|---|---|---|
| AU | 2014331897 | 4/2016 |
| WO | 2009094978 | 8/2009 |

OTHER PUBLICATIONS

European Search Report, dated Apr. 25, 2017, priority document.

*Primary Examiner* — Hilary L Gutman

(74) *Attorney, Agent, or Firm* — Greer, Burns & Crain, Ltd

(57) ABSTRACT

An anti-rattling restraint device and system for pallets in the cargo hold of an aircraft comprising a frame body with an upper side, lateral sides, a first and a second slot sets positioned on said lateral sides, a first and a second shaft, configured to slide along the first and second slot sets respectively, a threaded stud, a lever, comprising a first end, a second end and a lever slot substantially positioned on the second end of the lever, and lock positioned on the upper side of the frame body, wherein the threaded stud is connected to the second shaft, and further connected to the frame body by the lock, and the lever is connected to the frame body by the first and second shafts, and further connected to the threaded stud by the second shaft.

13 Claims, 6 Drawing Sheets

(56) References Cited

U.S. PATENT DOCUMENTS

| | | | | |
|---|---|---|---|---|
| 4,379,668 | A | 4/1983 | Pelletier | |
| 4,395,172 | A | 7/1983 | Hoener et al. | |
| 5,575,599 | A * | 11/1996 | Conlee | B60P 7/13 410/69 |
| 7,637,704 | B2 | 12/2009 | Morin | |
| 2008/0170925 | A1 * | 7/2008 | Marmur | B60P 7/13 410/80 |
| 2010/0143063 | A1 * | 6/2010 | Dugic | B64D 9/003 410/80 |
| 2010/0290855 | A1 * | 11/2010 | Strien | B65D 90/0006 410/77 |
| 2015/0225083 | A1 | 8/2015 | Gutenkunst et al. | |
| 2015/0329206 | A1 | 11/2015 | Larson et al. | |
| 2016/0250961 | A1 | 9/2016 | Tolly et al. | |
| 2017/0080845 | A1 * | 3/2017 | Guo | B60P 7/13 |

* cited by examiner

ANTI-RATTLING DEVICE FOR PALLETS IN CARGO AIRCRAFT

CROSS-REFERENCES TO RELATED APPLICATIONS

This application claims the benefit of the European patent application No. 16382553.2 filed on Nov. 24, 2016, the entire disclosures of which are incorporated herein by way of reference.

TECHNICAL FIELD OF THE INVENTION

The present invention belongs to the field of cargo aircraft payload restraint systems and, more particularly, to the field of anti-rattling restraint devices and/or systems for pallets in the cargo hold of an aircraft.

BACKGROUND OF THE INVENTION

Typically, in cargo aircraft, the payload is transported in pallets which are secured to the aircraft with a cargo restraint system. The restrain is usually achieved by means of two sets of latches which immobilize the pallet in three main directions of the aircraft. These latches are commonly devised to resist a rough treatment and to adapt to different kinds of load, and therefore have loose dimensional tolerances.

Document AU 2014331897 A1 describes a mechanically actuated cargo restraint system for a vehicle which includes a rotatable reel in a frame, two flexible tethers, and a mechanical device for the actuation thereof.

Document US 2015329206 A1 discloses an aircraft cargo handling system with a pair of load restraining rail assemblies, each of which has a shaft assembly running substantially parallel to the longitudinal axis of the aircraft, which enables the pallets to be locked in place sequentially by rotating the shaft assembly a predetermined angular rotation each time a pallet is loaded.

Document US 2015225083 A1 describes a cargo restraining assembly comprising two guidance and restraint bars running in parallel to each other, and at least one lateral bracket spanning between the two guidance and restraint bars and being fixedly connected to each of the two guidance and restraint bars. The lateral bracket includes a bracket foot formed integrally with the lateral bracket and a quick release mechanism configured to quick-releasably couple the bracket foot to a seat track profile of the cargo deck surface of the aircraft.

These inventions provide different ways of securing the cargo in an aircraft. But in some cases, when special equipment sensitive to shocks and vibrations is transported, or palletized seats are installed, the gaps between the cargo restraint system and the pallet must be reduced to zero in order to avoid unexpected movements and vibrations during flight.

Restraints with a nonexistent gap or a close to zero clearance can be used to overcome the rattling problem, but these kind of fixations usually require longer manipulation periods and the use of specialized tools, like screwdrivers, spanners or keys.

However, for certain applications, extended operation times are unacceptable, and therefore specific anti-rattling devices that can be easily fastened and/or released must be installed in the pallet. In addition, the restraint of the pallets in the aircraft cargo system must be done in all three main directions of the aircraft.

SUMMARY OF THE INVENTION

The present invention provides an alternative solution for the aforementioned problems, by an anti-rattling device for the fastening of pallets in cargo aircraft restrain systems and an anti-rattling system.

In a first inventive aspect, the invention provides an anti-rattling device for the fastening of pallets in cargo aircraft restrain systems, comprising:

a frame body, comprising an upper side, lateral sides, a first and a second slot sets positioned on said lateral sides, a first and a second shaft, configured to slide along the first and second slot sets respectively, a threaded stud, a lever, comprising a first end, a second end and a lever slot substantially positioned on the second end of the lever, locking means, such as a lock, positioned on the upper side of the frame body, and elastic means, wherein the threaded stud is connected to the second shaft, and it is further connected to the frame body by the locking means, and the lever is connected to the frame body by the first and second shafts, and it is further connected to the threaded stud by the second shaft said first and second shafts being connected there between by the elastic means, so that, when in use, the device locks the pallet to the cargo restrain system.

Unless defined otherwise, all technical terms used herein have the same meaning as commonly understood to one of ordinary skill in the art to which this disclosure belongs.

Throughout this entire document, the frame body will be understood as a frame suitable for housing the parts of the device and relating the device to external elements, e.g., the cargo pallet, the aircraft hold or a cargo latch. A further use of the frame body is to provide a mounting for the shafts, the locking means and the stud.

The lever should be understood as a mechanical element, essentially elongated, suitable for transmitting stresses to the frame body of the device, and to perform rotational and longitudinal movements. The lever comprises two ends, first or outer end, and second or inner end, according to its position in relation to the frame body, and a substantially central portion between said ends.

The locking means, or lock, will be understood as any type of device configured to retain the lever in a deployed or retracted position, as known to those skilled in the art.

Throughout this document pallet will be understood as any element suitable for carrying bulky and/or heavy loads, preferably a board or frame with standardized dimensions, such as an IATA ULD pallet or a 463L master pallet.

Advantageously, the locking means restrain the threaded stud in a position such that the outer end of the lever remains deployed against a fixed element, also known as deployed position; and the threaded stud is released upon actuation of the operator. Furthermore, the locking means are also capable of restraining the threaded stud in a position such that the outer end of the lever remains retracted inside of the frame body, also known as retracted position.

Advantageously, elastic means, or an elastic member, such a spring, are arranged between the first and second shafts, providing an elastic force either tending to bring both shafts together, or to set them apart, depending on the properties of the spring, the effect being a net force tending to keep the lever in one of the stablished positions. Furthermore, the elastic means help controlling the movement of the lever. Also, the elastic means help controlling suppressing the gap between the roller and a cargo latch.

In a particular embodiment, the lever is configured to slide along the first slot set and to pivot around the first shaft, and the second shaft is configured to slide along the lever slot.

Advantageously, the lever performs two movements upon actuation of the operator, a sliding movement along the first slot set and a pivoting movement around the first shaft, fitted in the central portion of the lever; furthermore, the lever is capable of a longitudinal sliding movement along the lever slot as a result of the sliding connection between the second shaft and the lever slot.

In a particular embodiment, the lever is configured to move between a retracted position, and a deployed position.

Advantageously, the movements of the lever result in a displacement of the outer end of the lever outwards of the frame body until gets in contact with a cargo latch, and then upwards, where the lever is subsequently immobilized by the threaded stud, hence reducing the gap between the lever and the latch to zero.

In a particular embodiment, the two ends of the lever define two respective misaligned longitudinal axes which intersect in a substantially central portion of the lever.

Advantageously, a bent configuration of the lever enables the contact with the latch with a shorter movement of the stud, or otherwise enables a smaller frame body thanks to a more convenient positioning of the outer end of the lever.

In a particular embodiment, the first shaft fits in a through hole positioned substantially on the intersection of the two misaligned axes of the lever.

Advantageously, the first shaft is fitted in the through hole, positioned in the central portion of the lever, thus defining a fulcrum capable of sliding along the first set of slots.

In a particular embodiment, the lever comprises a roller positioned on its first end.

Advantageously, the roller ensures a smooth contact with the latch. This roller can be made of a slightly deformable or soft material, such as rubber or a polymer.

In a particular embodiment, the locking means are configured to lock the lever either in its retracted position, or in its deployed position.

Advantageously, the locking means cause the lever to remain in a deployed position without the intercourse of an operator for long periods, e.g., during flight, or to remain in a retracted position while downloading the pallet. Hence, the loading operations can be performed by a single person.

In a particular embodiment, the locking means comprise a hollow tubular threaded part, configured to fit in a through hole of the upper side of the frame body.

Advantageously, the locking means perform a further function by providing a screwing interconnection between the threaded stud and the frame body. Therefore, in this embodiment, the locking means actuate directly on the threaded stud by impeding its movements.

In a particular embodiment, the threaded stud, configured to fit in the hollow tubular threaded part of the locking means, comprises a threaded cylindrical body and one end with a through hole connected to the second shaft.

Advantageously, the application of a rotational movement on the locking means involve a vertical movement of the stud, which in turn pushes down or pulls up the second shaft and moves the lever. The end of the stud, with a through hole connected to the second shaft, will be conveniently referred to as lower end of the stud, or simply lower end.

In a particular embodiment, the first slot set is in a substantially inclined position relative to the second slot set.

Advantageously, a non-parallel, non-perpendicular, or oblique arrangement of the first and second slot sets enables simultaneous vertical and horizontal movements of the lever.

In a particular embodiment, the locking means further comprise initiating means configured to move the threaded stud.

Advantageously, the initiating means provide a single actuation mechanism for the device, procuring control and driving force.

In a particular embodiment, the initiating means comprise a hand-operable wheel, configured to produce a linear movement on the threaded stud.

Advantageously, the initiating means comprise a hand-operated wheel or handle which enables the user to provide a vertical movement to the threaded stud through the locking means.

In a second inventive aspect, the invention provides an anti-rattling system comprising one or more anti-rattling devices and a set of fixed latches.

As it has been already mentioned, this invention is suitable for being used in a pre-existing cargo restrain system; therefore, in this document, latch should be understood as any fixed element, part of said restrain system, which connects the cargo items to the aircraft hold. Advantageously, the latch is a hook or clamp, shaped as an inverted L, fastened to the aircraft floor. Advantageously, more than one anti-rattling devices conveniently placed provide a safe restrain mechanism for a pallet in at least two directions.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

Figure 5:
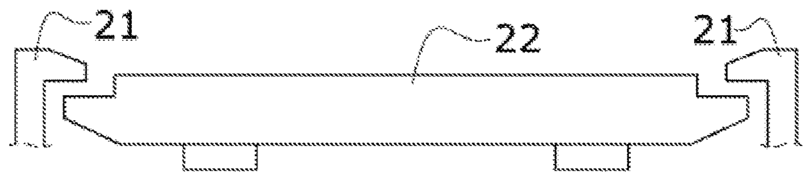
FIG. 5 this figure shows a pallet restraint system as known in the prior art, including a latch and a pallet.
Figure 6:
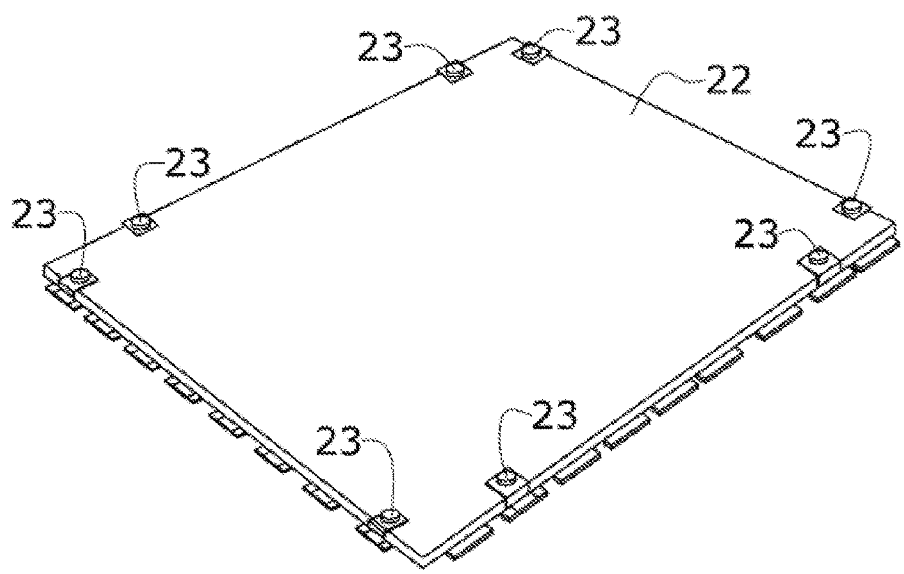
FIG. 6 this figure shows a plurality of anti-rattling devices, placed in a pallet.

FIG. 5 shows the known prior art in the field of pallet (22) restrain systems. In its simplest embodiment, it comprises the pallet (22) itself, and a set of latches (21) anchored to the aircraft cargo hold.

The present invention refers to a device (23) for avoiding rattling, which overcomes the problems of the prior art by reducing the gap between the latches (21) of a cargo restraint system (20) in an aircraft and a pallet (22) in two directions. When more than one device (23) is installed in a non-parallel disposition in a cargo restraint system (20), the gap is reduced between the latches (21) and a pallet (22) in three directions.

Figure 1A:
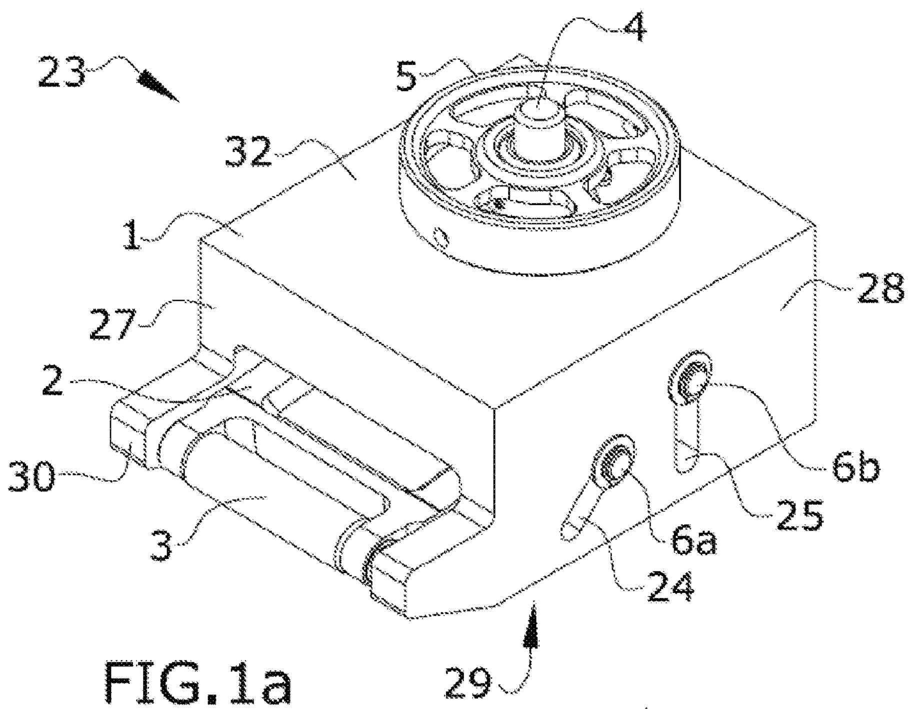
FIGS. 1*a*-1*b* show a full view of a preferred embodiment of the device and a full view of the core of the device.
Figure 1B:
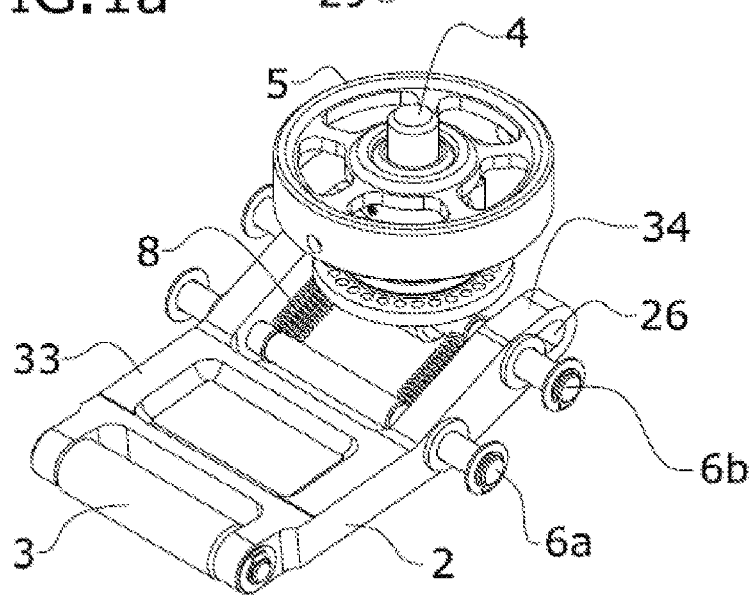

FIG. 1*a* shows an embodiment of the device (23), where some of its components can be seen, namely the frame body (1), the initiating means (5), the roller (3), the lever (2), the first shaft (6*a*) and the second shaft (6*b*), the first slot set (24) and the second slot set (25). FIG. 1*b* shows the device (23), with the frame body (1) removed in order to distinguish the elements placed inside the frame body (1) or core of the device (23). In addition to the above mentioned elements, FIG. 1*b* further shows the locking means (7) and the elastic means (8).

Figure 2A:
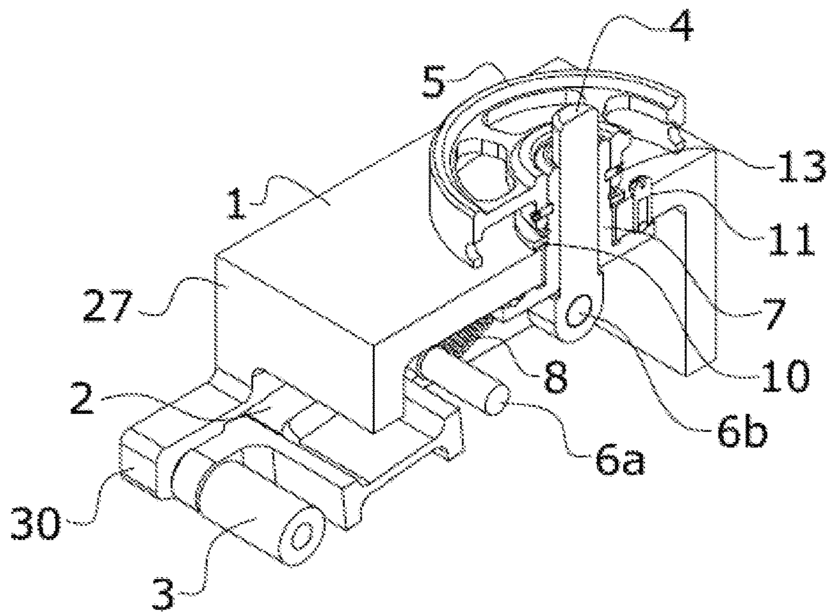
FIGS. 2*a*-2*b* show a cross section view of a preferred embodiment of the device and a cross section view of the core of the device.
Figure 2B:
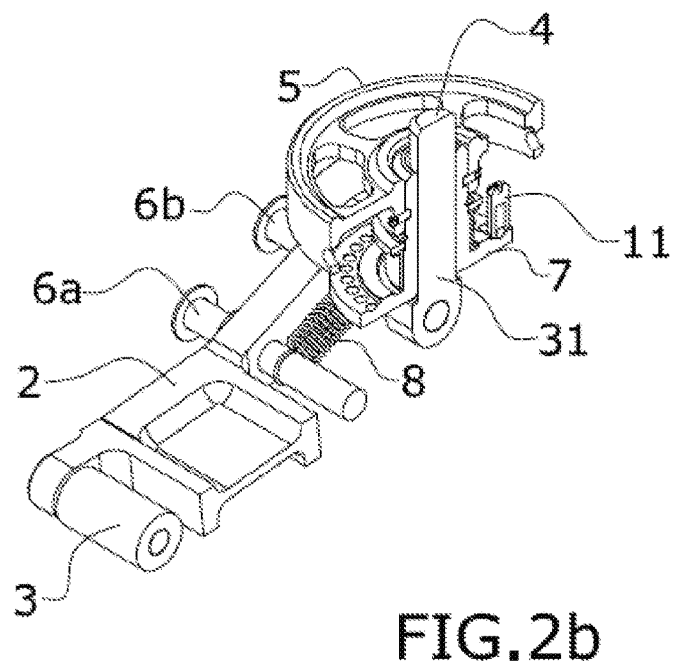

FIGS. 2*a* and 2*b* show a cross section view of the device (23) showing the internal arrangement of the elements and the relations there between:

The lever (2) is connected with the frame body (1) through the first shaft (6*a*) and the first slot set (24).

The lever (2) is further connected to the lower end (31) of the threaded stud (4) by means of the second shaft (6*b*), which slides along the lever slot (26).

The stud (4) is connected to the frame body (1) through the locking means (7), being displaceable up and down by means of a turning movement of the initiating means (5).

The first and second shafts (6*a*, 6*b*) are mutually connected with the elastic means (8).

Figures 3A, 3B, 3C:
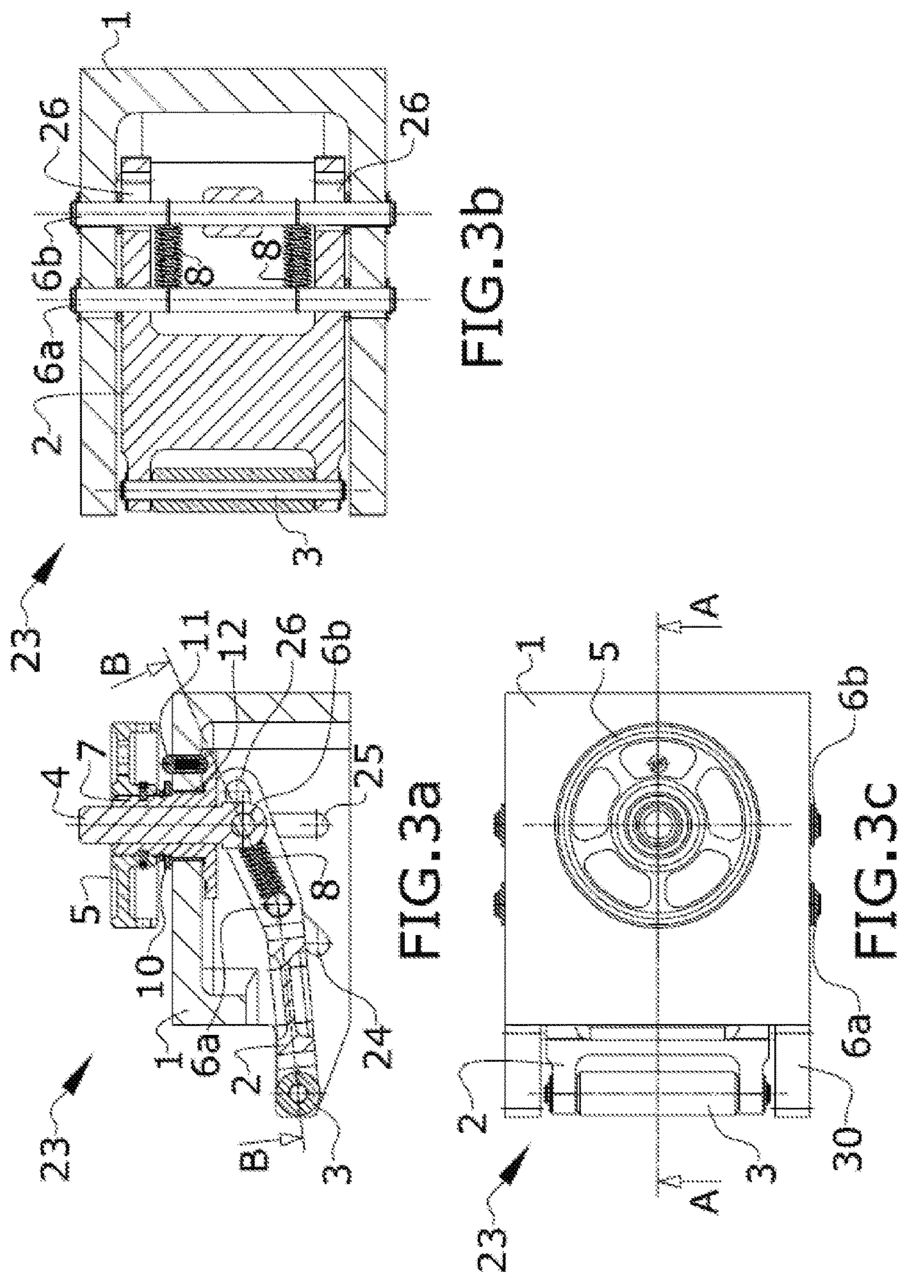
FIGS. 3*a*-3*c* show a cross section side view (A-A), a cross section top view (B-B) and a top view of the anti-rattling device.

FIGS. 3*a*-3*c* provide further detail with a side and two top views of the device. As can be appreciated on these figures, the lever (2) is an essentially flat and elongated element, with hollow portions intended to make the lever (2) lighter. The lever (2) presents at least two through holes, one devised to fit the roller (3) in the outer end (33) of the lever (2), and the other in the central portion of the lever (2), to fit the first shaft (6*a*). In the inner end (34) of the lever (2), a lever slot (26) provides a linkage for the lower end (31) of the threaded stud (4). Furthermore, the lever (2) shows a bend in its central portion, where the second through hole is located. The bend enables the outer end of the lever (2) to easily reach the latch (21), without a large frame body (1) and/or a long stud (4). Preferably, the lever (2) is made of a material such as steel, composite materials, polymers or similar.

The frame body (1) is an essentially hollow element, suitable for being attached to the pallet (22) and for housing part or all the elements of the device. In the embodiment shown in FIGS. 1-4, the frame body (1) is shaped like a rectangular prism or box, with an open lower side (29) and a partially open front side (27). Two essentially trapezoidal protrusions (30) extend outwards in the lower part of the front side (27), the protrusions (30) being devised to partially cover the outer end of the lever (2) on its retracted position. Furthermore, the two sets of slots (24, 25) are opened in the lateral sides (28) of the frame body (1), the second slot set (25) being substantially vertical, and the first slot set (24) being substantially inclined with respect to the second slot set (25). The shafts (6*a*, 6*b*) are capable of sliding along the first and second slot sets (24, 25), respectively, and are fastened to the frame body (1) with the help of retaining rings. The first (6*a*) and second (6*b*) shafts are mutually connected by means of the elastic means (8), a set of two springs in this embodiment, which helps keeping the position of the lever (2) and avoids unintended movements thereof.

The second shaft (6*b*) is also capable of sliding along the lever slot (26), the second shaft (6*b*) being further connected to the threaded stud (4). In this embodiment, the stud (4) is a threaded bolt, with its lower end (31) configured to be connected to the second shaft (6*b*). The threaded portion of the stud (4) is devised to fit in the locking means (7), which is threaded inside. The locking means (7) comprise a set of retainers (11, 13), a washer (10), a bushing (12) and a substantially annular, flat element with openings, adapted to impede the rotation of the locking means (7), therefore locking the vertical movement of the stud (4). In a preferred embodiment, a ball retainer (11) is placed in the locking means (7), in such a way that fits in the openings of the flat element. The bushings (12) provide a sliding interface between the frame body (1) and the stud (4). In order to provide a rotating motion to the locking means (7), initiating means (5) are fitted outside the locking means (7); in a preferred embodiment, these initiating means (5) are a simple hand-operated wheel or handle which enable the operator to control and actuate the device.

The claimed device (23) is preferably placed in an opening of the pallet (22), substantially on the edge of the pallet (22); the anti-rattling device (23) is mechanically joined to the pallet (22) by conventional means, such as bolts, nails, by welding or using adhesives.

Operation Method

Once the pallet (22) is placed in the designated position, a hand-operated wheel is turned by an operator; the hand-operated wheel produces a rotation of the locking means (7), which moves the threaded stud (4) up or down depending on the rotation direction. When the stud (4) moves down, it pushes the second shaft (6*b*) and hence the lever (2) pivots around the first shaft (6*a*), and the roller (3) on the outer end of the lever (2) moves up until it reaches the horizontal flange of the XZ or the YZ latch (21). When the hand-operated wheel is rotated even more, the stud (4) still goes down, but due to the effect of the inclined first slot set (24), the roller (3) moves then horizontally until it reaches the vertical face of the XZ or the YZ latch (21). In that position the locking means (7) get locked and the gaps between the pallet (22) and the cargo restraint system (20) are reduced to zero.

When the pallet (22) has to be manipulated, the anti-rattling device (23) can be retracted in order to avoid any accidental contact with an external element or with the cargo loading system (20) itself; the hand-operated wheel is rotated until the second shaft (6*b*) reaches the upper end of the second slot set (25) and the stud (4) is subsequently locked.

Figure 4A:
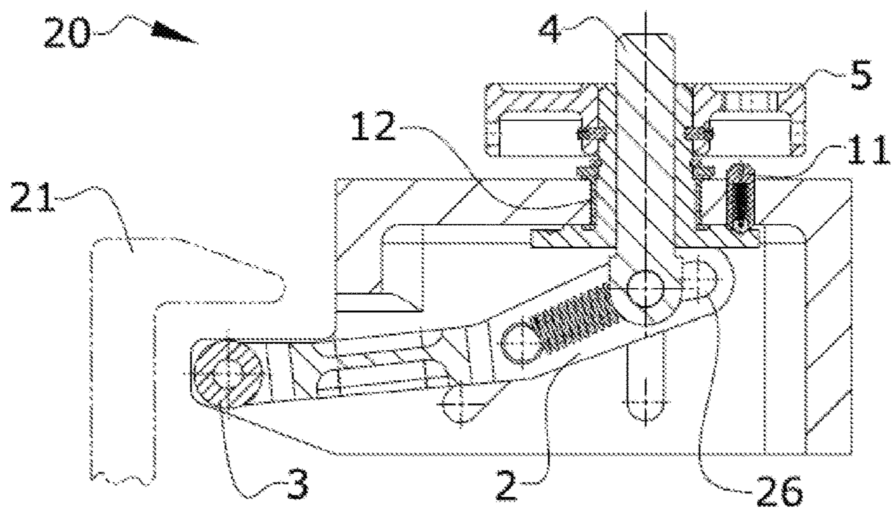
FIGS. 4*a*-4*d* show four operating positions of the anti-rattling device.
Figure 4B:
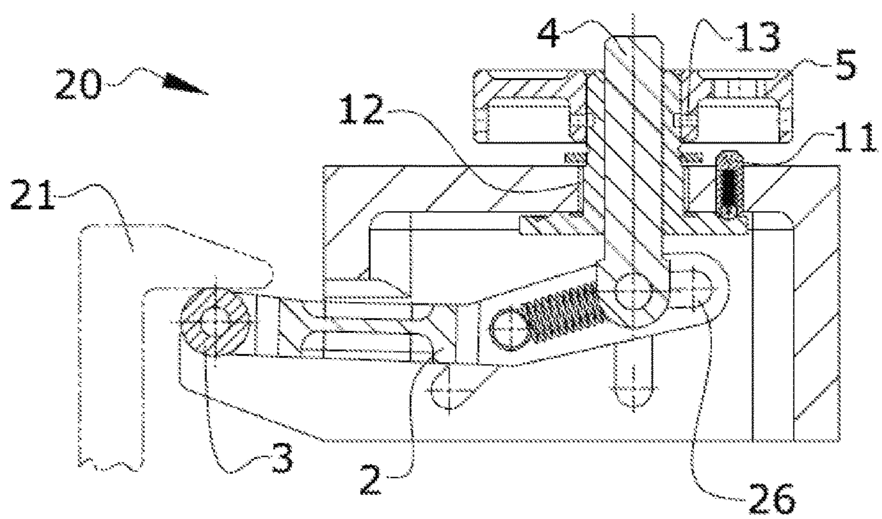
Figure 4C:
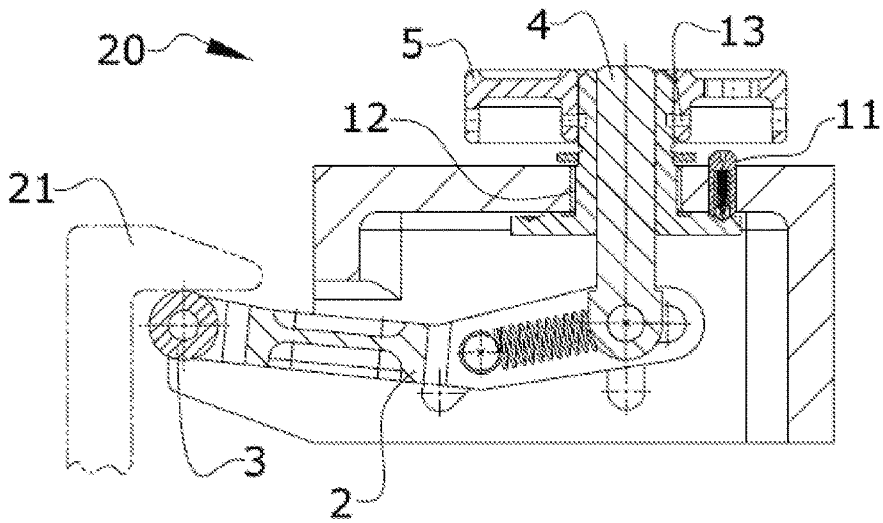
Figure 4D:
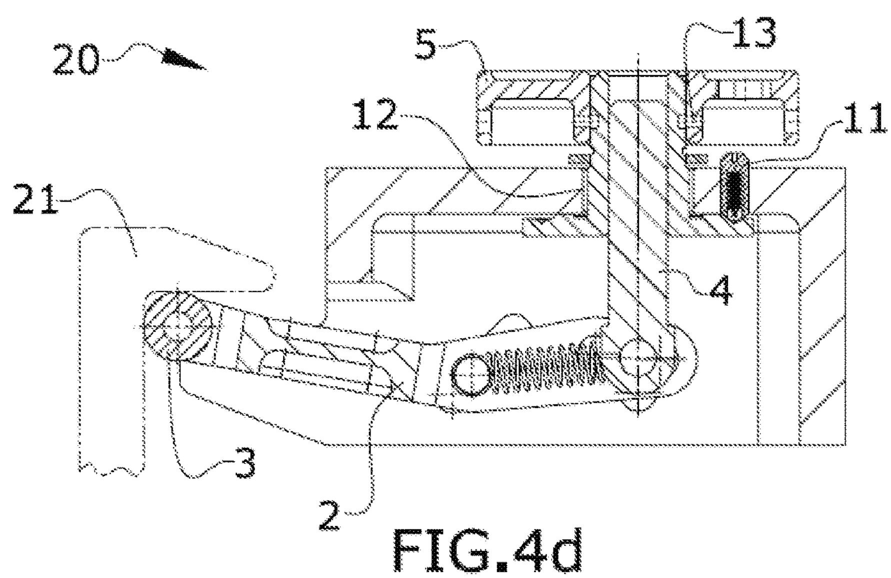

FIGS. 4*a*-4*d* show the operation sequence:

in FIG. 4*a* the anti-rattling device (23) is in the initial retracted position;

when it is desired to fasten the pallet (22) to the cargo loading system (20), the operator turns the hand-operated wheel, as shown in FIG. 4*b*, producing a pivoting movement of the lever (2), until the roller (3) comes into contact with the horizontal flange of the latch (21), when this position is reached, the roller (3) cannot displace upwards any longer, and a further rotation of the hand-operated wheel produces a horizontal displacement of the roller (3), as seen on FIG. 4*c*, the hand-operated wheel can be turned until the roller (3) comes into contact with vertical face of the latch (21), and the anti-rattling device (23) is finally locked, as shown in FIG. 4*d*.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An anti-rattling device for the fastening of pallets in cargo aircraft restrain systems, comprising:

- a frame body, comprising an upper side, lateral sides, a first and a second slot set positioned on said lateral sides,
- a first and a second shaft, configured to slide along the first and second slot sets respectively,
- a threaded stud,
- a lever, comprising a first end, a second end and a lever slot, substantially positioned on the second end of the lever,
- a lock positioned on the upper side of the frame body, and an elastic member,
  - the threaded stud being connected to the second shaft, and being further connected to the frame body by the lock, and
  - the lever being connected to the frame body by the first and second shafts, and being further connected to the threaded stud by the second shaft, said first and second shafts being connected there between by the elastic member,
- so that, when in use, the anti-rattling device locks the pallet to the cargo restrain system.

2. The anti-rattling device according to claim 1, wherein the lever is configured to slide along the first slot set and to pivot around the first shaft, and the second shaft is configured to slide along the lever slot.

3. The anti-rattling device according to claim 1, wherein the lever is configured to move between a retracted position, and a deployed position.

4. The anti-rattling device according to claim 1, wherein the two ends of the lever define two respective misaligned longitudinal axes which intersect in a substantially central portion of the lever.

5. The anti-rattling device according to claim 1, wherein the first shaft fits in a through hole positioned substantially on an intersection of the two misaligned axes of the lever.

6. The anti-rattling device according to claim 1, wherein the lever comprises a roller positioned on its first end.

7. The anti-rattling device according to claim 3, wherein the lock is configured to lock the lever either in its retracted position, or in its deployed position.

8. The anti-rattling device according to claim 1, wherein the lock comprises a hollow tubular threaded part, configured to fit in a through hole of the upper side of the frame body.

9. The anti-rattling device according to claim 8, wherein the threaded stud, configured to fit in the hollow tubular threaded part of the lock, comprises a threaded cylindrical body and one end with a through hole connected to the second shaft.

10. The anti-rattling device according to claim 2, wherein the first slot set is in a substantially inclined position relative to the second slot set.

11. The anti-rattling device according to claim 1, wherein the lock further comprises initiating means configured to move the threaded stud.

12. The anti-rattling device according to claim 11, wherein the initiating means comprise a hand-operable wheel, configured to produce a linear movement on the threaded stud.

13. An anti-rattling system comprising one or more anti-rattling devices according to claim 1 and a set of fixed latches.

* * * * *